United States Patent
Amano

(10) Patent No.: US 7,304,980 B2
(45) Date of Patent: Dec. 4, 2007

(54) METHOD OF TRANSMITTING TRANSPARENT DATA

(75) Inventor: Shigeru Amano, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 227 days.

(21) Appl. No.: 11/246,198

(22) Filed: Oct. 11, 2005

(65) Prior Publication Data

US 2006/0092894 A1 May 4, 2006

(30) Foreign Application Priority Data

Nov. 1, 2004 (JP) ............................. 2004-317803

(51) Int. Cl.
*H04Q 7/20* (2006.01)
*H04Q 7/34* (2006.01)

(52) U.S. Cl. .................. 370/349; 370/345; 370/343; 370/310; 370/336; 370/329; 370/328; 455/422.1; 455/403; 455/67.1; 455/423; 455/424; 455/425; 455/500

(58) Field of Classification Search ................ 370/349, 370/350, 345, 343, 310, 336, 329, 328; 455/426.1, 455/426.2, 423, 424, 425, 67.11, 422.1, 403, 455/500, 517, 69, 522, 466, 41.1, 41.2, 350
See application file for complete search history.

(56) References Cited

U.S. PATENT DOCUMENTS 6,363,425 B1 * 3/2002 Hook et al. ................. 709/226
6,826,168 B2 * 11/2004 Galyas et al. ............... 370/340

OTHER PUBLICATIONS

"Specification of the Bluetooth", Specification vol. 2, Wireless connections made easy, Core System Package [Controller volume], Version 1.2, pp. 151-152, Nov. 5, 2003.

* cited by examiner

*Primary Examiner*—Keith Ferguson
(74) *Attorney, Agent, or Firm*—Nixon Pebody LLP; Donald R. Studebaker

(57) ABSTRACT

Transparent data transmission service is kept optimal in the quality provided. A transmission quality monitor section, provided in a base-band signal processing circuit of each apparatus, monitors an error in reception data and an response, to the data transmitted, of from an opposite apparatus, thereby measuring an error rate. When the error rate exceeds a set level, the transmission scheme as to transparent data is switched over to a scheme higher in probability of normal reception (e.g. packets added with error correction codes). Meanwhile, when the error rate lowers to a set level or lower, the transmission scheme as to transparent data is switched over to a scheme higher in transmission efficiency.

19 Claims, 4 Drawing Sheets

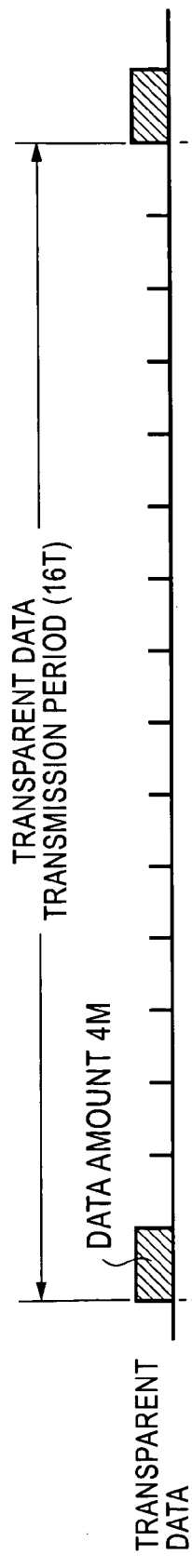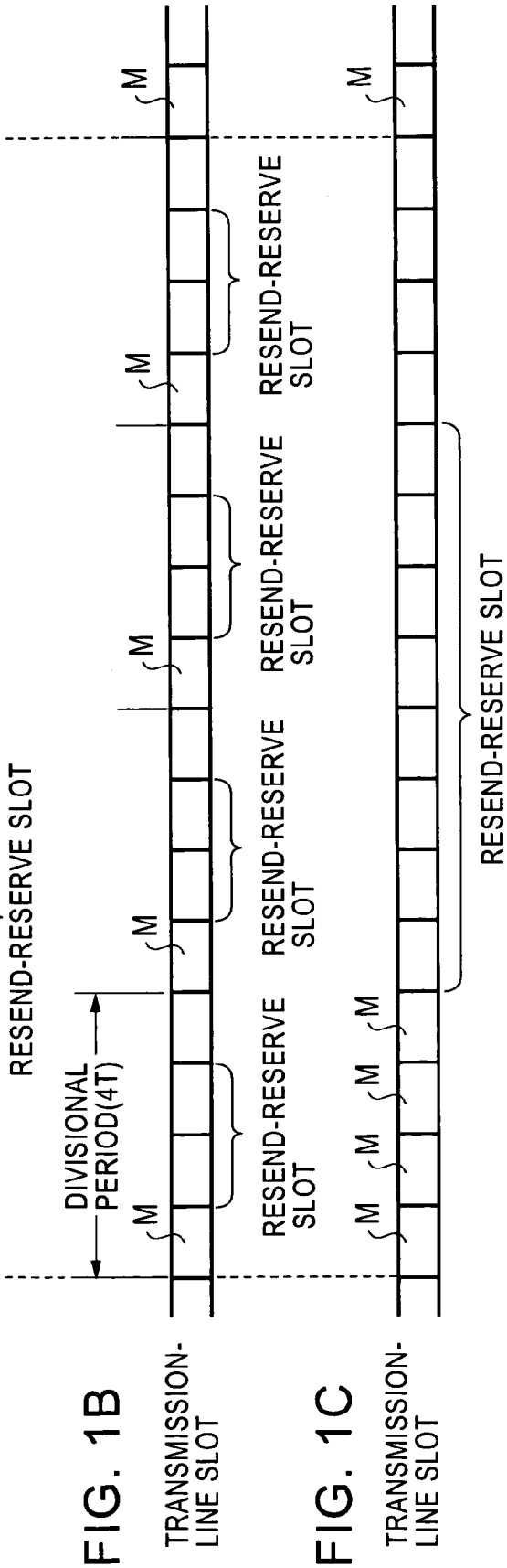

METHOD OF TRANSMITTING TRANSPARENT DATA

BACKGROUND OF THE INVENTION

1. Technical Field of the Invention

The present invention relates to a method of transmitting transparent data on a radio system, and more particularly to a method of transmitting transparent data requiring a real-time nature, as in audio or video streaming data, by means of a radio system, such as of Bluetooth (Bluetooth SIG Inc. trademark, United States).

2. Description of the Related Art

Recently, there are a diversity of applications for communication requiring such real-time natures as to sequentially transmit a set amount of data within a constant time period by means of packet transmission, as in audio or video streaming data.

The need for supporting such application on the radio system is increasing. In radio transmission, packet missing is unavoidable due to on-transmission-line errors because of readily suffering from the effect of fading or external noise. Even on such an application as requiring real-time natures, where specialized for audio transmission, the effect of on-transmission-line errors can be reduced by adopting an audio coding scheme, or the corresponding control scheme, for the human eye to less perceive an error through the function of audio CODEC even upon an occurrence of packet missing due to on-transmission-line error.

However, due to the diversified applications, there is a difficulty in specifying the application concerned, thus making it difficult to reduce the influence of on-transmission errors. Consequently, there is a requisite need for a transmission scheme capable of reducing on-transmission-line errors and securing real-time nature. Furthermore, on a packet-transmission-based radio system, other services than those of streaming data are to be offered concurrently. Considerations must be given to the compatibility with those services.

FIGS. 1A to 1C are figures showing transmission schemes as to transparent data.

FIG. 1A shows that, taking an on-transmission-line slot interval as T, where there is a need to process data in a certain amount (e.g. 4M) with a constant period of transparent-data transmission (e.g. 16T), the data in an amount 4M is sent as one packet on the first slot in the period. When a transmission error occurs within the first slot, resend can be subsequently effected by use of a resend-reserve slot assigned for resending the transparent data until transmission is normally done. The slots successful in normal transmission are used for transferring data of another application, including resend-reserve slots.

The transmission scheme of FIG. 1A has a feature as follows.

For the transmission service of transparent data, the information to be sent on one packet is in an increased amount. This increases the efficiency of transfer per packet thus enabling to increase the total efficiency of slot use. Meanwhile, because of transferring information in greater amount in a brief time, there is a difficulty or impossibility in adding redundant bits such as error correction codes. For this reason, where the quality of transmission line is worse, there arises a fear that data transfer is not available because of transmission errors.

For the total service of data transfer to offer, the efficiency of slot use can be raised in a state that transmission line quality is well and resend is not raised frequently. Meanwhile, because a smaller number of slots are to be transferred in a constant time period, there is not always a need to provide resend occasions in the same number of times as those with a shorter period of packet transmission. By reducing the resend occasions, the total efficiency of transfer can be raised including other services.

FIG. 1B shows that, taking an on-transmission-line slot interval as T similarly, where there is a need to process data in a certain amount (e.g. 4M) in every period of constant transparent-data transmission (e.g. 16T), the period of transparent-data transmission is divided into a plurality of time periods (e.g. four time periods wherein one time period is given 4T), to send data in an amount M as one packet on the first slot of each divisional period. When a transmission error occurs in the first slot, resend can be subsequently effected by use of a resend-reserve slot until transmission is normally done. The slots successful in normal transmission are used for transferring data of another application, including resend-reserve slots.

FIG. 1C shows that, taking an on-transmission-line slot interval as T similarly, where there is a need to process data in a certain amount (e.g. 4M) in every period of constant transparent-data transmission (e.g. 16T), the data in an amount 4M is divided to produce four packets each having a data amount M, to sequentially send the slots starting from the first one in the constant time period. When a transmission error occurs, resend can be effected by use of a resend-reserve slot until transmission is normally done. The slots, successful in normal transmission as to all the four packets, are used for data transfer for another application.

The transmission schemes of FIGS. 1B and 1C have features as follows.

For the transmission service as to transparent data, the information to be sent on one packet is in a reduced amount. This makes it possible to add redundant bits in greater amount correspondingly, thus realizing an effective error correction. Meanwhile, because of addition of overhead data besides the data to be used on the applications, the efficiency of packet transfer per packet is reduced and hence the total efficiency of slot use becomes low.

For the total service of data transfer to offer, the slots in the greater number are used for transmission of transparent data. This reduces the slots to be assigned for other services, thus reducing the efficiency of transfer.

Non-patent Document 1, "Specification of the Bluetooth System" vol 2, ver 1.2, Nov. 5, 2003, p 151-152 (United States), regulates a transmission scheme of extended SCO (Synchronous Connection Oriented) transparent data in Bluetooth.

As noted before, the transmission schemes of transparent data in FIGS. 1A to 1C involve merits and demerits. Particularly where using a transmission line not stable in transmission quality as in the radio system, it is not proper to employ any one scheme fixedly. However, Non-patent Document 1 does not regulate a transmission scheme for providing an efficient transmission line to a transmission line not stable in transmission quality.

SUMMARY OF THE INVENTION

It is an object of the present invention to keep optimal the provision quality of transparent data transmission service and other data transmission service by dynamically changing transmission scheme in accordance with varying transmission quality.

The invention is a transparent data transmission method for transmitting data in a set amount by means of a radio packet at a constant time interval from a first apparatus to a second apparatus, the method comprising: measuring a transmission quality at the first apparatus by monitoring a response signal sent from the second apparatus each time the data is transmitted; and transmitting subsequent data to the second apparatus using a first transmission scheme when a measured transmission quality satisfies a set level, while transmitting the subsequent data by switching over to a second transmission scheme higher in probability of normal reception than the first transmission scheme when the measured transmitting quality does not satisfy the set level. According to another aspect of the invention, the method comprises: measuring a transmission quality at the second apparatus by monitoring data sent from the first apparatus each time the data is transmitted; and sending an instruction to the first apparatus to perform a transmission by selecting a transmission scheme higher in probability of normal reception when a measured transmission quality does not satisfy a set level, while sending an instruction to the first apparatus to perform a transmission by selecting a transmission scheme higher in transfer efficiency when the measured transmission quality satisfies the set level.

In the invention, in case the transmission quality of the data satisfies a set level, transmission is by the usual transmission scheme. When lowered below the set level, transmission is by a switchover to a transmission scheme higher in probability of normal reception. This provides an effect that transmission scheme is dynamically switched over depending upon transmission quality thus keeping the transmission service with a provision quality in an optimal state.

It is possible to use, at any time, a scheme added with an error correcting redundant code, a scheme set with an increased number of resend-reserve packets, or a scheme set long in period of data transmission. Meanwhile, for switchover of transmission scheme, it is possible to employ a method using two thresholds to provide a hysteresis characteristic and a method for execution when a state a switchover is to be made continues for a constant time or longer.

BRIEF DESCRIPTION OF THE DRAWINGS

FIGS. 1A to 1C are figures showing transmission schemes of transparent data;

DETAILED DESCRIPTION OF THE INVENTION

Figure 2:
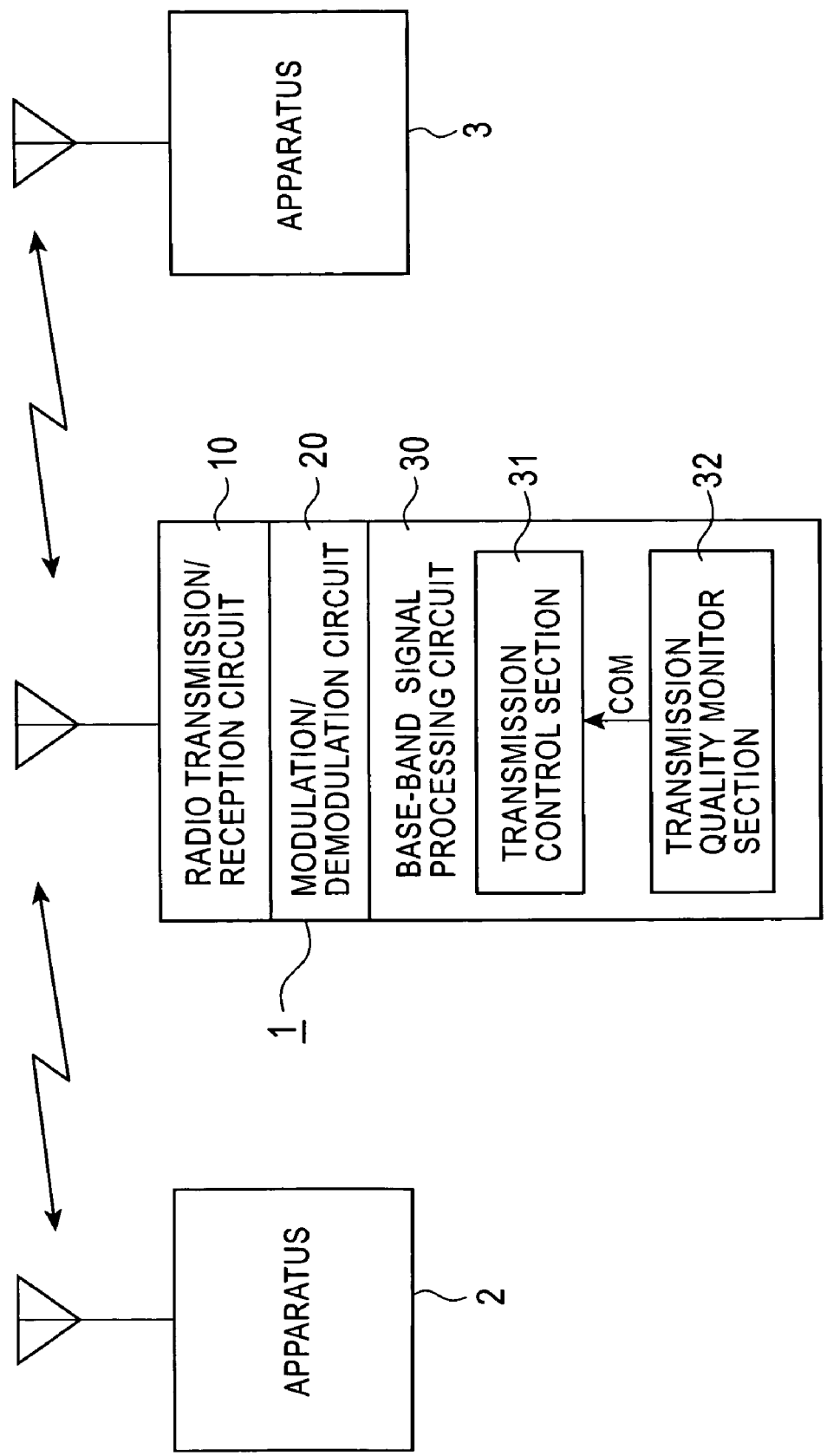
FIG. 2 is a concept view of a transparent data transmission system showing an embodiment of the invention.

FIG. 2 is a concept figure of a transmission system for transparent data showing an embodiment of the present invention.

The transparent-data transmission system has a plurality of apparatuses 1, 2, 3, . . . connected together by a radio line of a packet scheme. Each apparatus has a radio transmission/reception circuit 10, a modulation/demodulation circuit 20 and a base-band signal processing circuit 30, as shown in the apparatus 1, for example. In the base-band signal processing circuit 30, there are provided a transmission control section 31 for transmitting or receiving application data by packetization according to a designated transmission control procedure, and a transmission-quality monitor section 32 for measuring a transmission quality on the transmission line. Incidentally, a data processing section is omitted in the showing which is for processing application data for audio, video or other use.

The transmission control section 31 is arranged to perform a transmission control procedure according to a transparent-data transmission scheme in FIGS. 1B and 1C, in addition to a transparent-data transmission scheme in FIG. 1A. Switchover is possible as to by which transmission control procedure and by use of what parameter data transmission/reception is performed, at any time, according to a control signal CON given from the transmission-quality monitor section 32.

Furthermore, the transmission control section 31 packetizes application data according to a parameter designated by the provided control signal CON, and sends it by adding, as control information, information about coding scheme, etc. to a header of the packet. Accordingly, the transmission control section 31, at the reception end, is allowed to know a coding scheme, etc. by examining the header of a received packet so that it can performing a decode processing according to a designated coding scheme.

The transmission-quality monitor section 32 is not only to measure a transmission quality of a reception line by monitoring received, demodulated data but also to measure a transmission quality of a transmission line through which data is to be sent to the opposite end. Namely, the transmission control sections 31, of the apparatuses at transmission and reception ends, exchange confirmation-of-delivery flag in confirming whether or not data transfer to the opposite is successful, in order to fulfill low-consumption power performance and slot use efficiency. By examining the confirmation-of-delivery flag (ACK, NAK, etc.) sent from the opposite, transmission quality is measured as to the transmission line.

The transmission-quality monitor section 32 monitors, at a constant time interval, the total number of packets received (Rall), the number of erroneous packets of the packets received (Rerr), the total number of packets transmitted (Tall), and the number of receptions of confirmation-of-delivery flags (ACK) as to the packets transmitted. Based on the monitor result of those, an error rate (Etp) in a relevant period is to be calculated by the following equation.

$Etp = ((Tall - Tack) + Rerr) / (Tall + Rall)$

When the error rate (Etp) is smaller than a predetermined threshold (Eth), i.e. when errors are less, the transmission-quality monitor section 32 sets a parameter A. When the error rate is greater than the threshold, it sets a parameter B. Thus, it provides the parameter as a control signal CON to the transmission control section 31.

The parameter is set with packet type (Ptype), transparent-data transmission period (Tint) and the number of resend-reserve slots (Tret) for resend transparent data. Incidentally, packet type (Ptype) is to designate a data encode structure, i.e. coding rate.

For example, provided that parameter A is given for the transmission scheme of transparent data in FIG. 1A, the parameter A has a packet type (Ptype) of coding rate 1/1 (i.e. no error correction codes), a transparent-data transmission period (Tint) of 16T and the number of resend reserve slots (Tret) of 8. Meanwhile, provided that parameter B is given for the transmission scheme of transparent data in FIG. 1B, it has a packet type (Ptype) of coding rate 1/3 (i.e. 2-bit error correction codes be added to 1 bit of data), a transparent-data transmission period (Tint) of 4T and the number of resend reserve slots (Tret) of 2. Furthermore, provided that parameter C is given for the transmission scheme of transparent data in FIG. 1C, it has a packet type (Ptype) of coding rate 1/3 (i.e. 2-bit error correction codes be added to 1 bit of data), a transparent-data transmission period (Tint) of 16T and the number of resend reserve slots (Tret) of 8.

Figure 3:
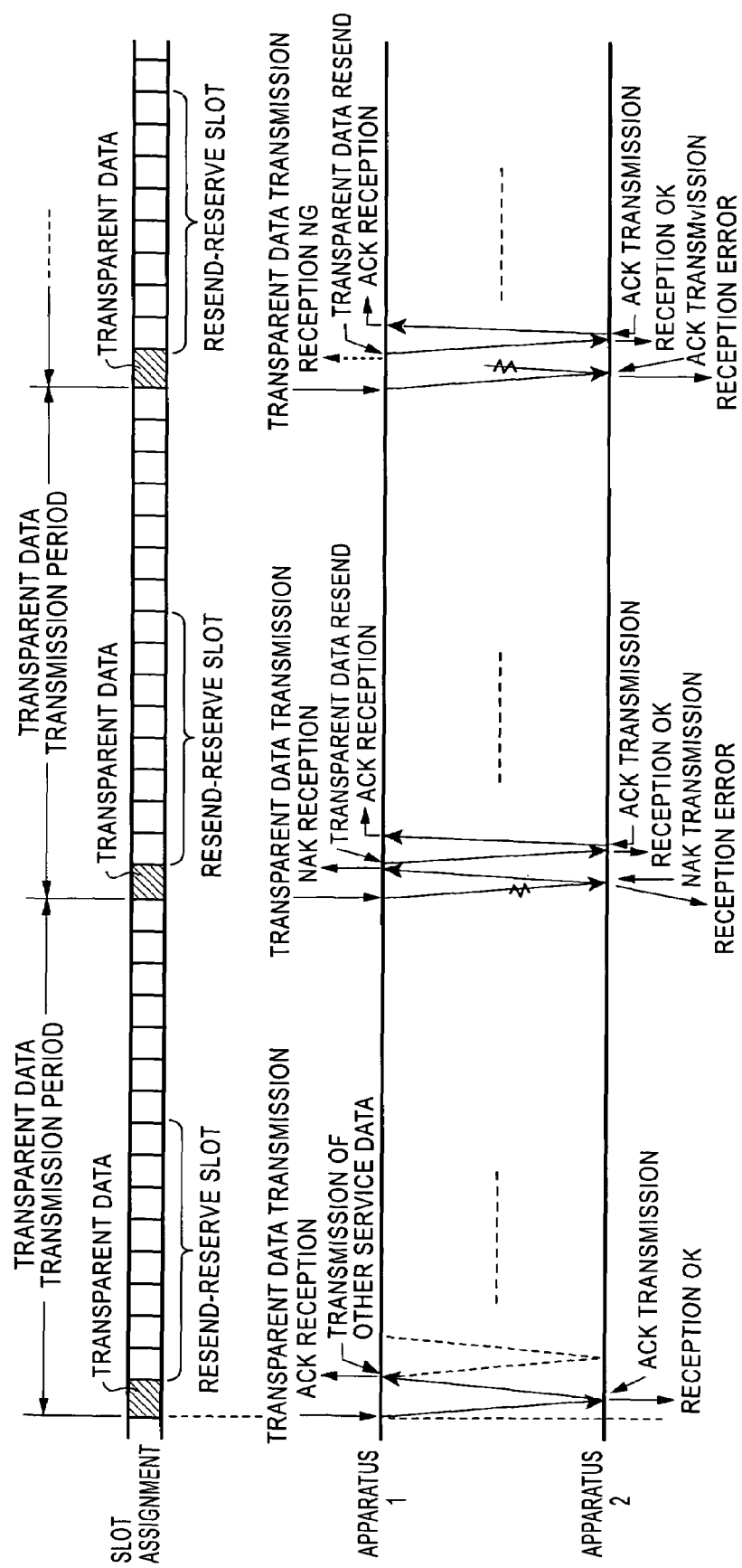
FIG. 3 is a packet transmission sequence chart (−1) in FIG. 1.

FIG. 3 is a packet transmission sequence chart (−1), in FIG. 2, showing an example to send packet data from the apparatus 1 to the apparatus 2, in FIG. 2, according to the transmission scheme of FIG. 1A.

In the first transparent-data transmission period, the apparatus 2 receives normally the first transparent data from the apparatus 1 and sends a confirmation-of-delivery flag (ACK) back to the apparatus 1. By normally receiving it at the apparatus 1, delivery of the first transparent data completes. Although the subsequent slots are reserved for resend, those are assigned for data transfer for another service because resent becomes unnecessary.

In the second transparent-data transmission period, because the second transparent data sent on the first slot is detected an error at the apparatus 2 due to on-transmission-line error, a resend request flag (NAK) is replied from the apparatus 2 to the apparatus 1. Due to this, the apparatus 1 resends the transparent data on the next slot reserved for resend. Because the resent transparent data is normally received at the apparatus 2, a confirmation-of-delivery flag (ACK) is replied from the apparatus 2. Due to this, delivery of the second transparent data completes. The subsequent slots are assigned for data transfer for another service.

In the third transparent-data transmission period, because the third transparent data sent on the first slot is normally received at the apparatus 2, a confirmation-of-delivery flag (ACK) is replied from the apparatus 2. However, the apparatus 1 cannot receive the confirmation-of-delivery flag (ACK) due to on-transmission-line error. Accordingly, the apparatus 1 resends the third transparent data by use of a slot reserved for resend. The resent transparent data is normally received at the apparatus 2. In the apparatus 2, because the third transparent data is already received correctly, the resent transparent data is discarded. However, a confirmation-of-delivery flag (ACK) is replied to the apparatus 1. The apparatus 1 receives normally the confirmation-of-delivery flag (ACK) thus completing the delivery of the third transmission data. The subsequent slots are assigned for data transfer for another service.

The transmission-quality monitor section 32 of the apparatus 1 monitors the transmission status of transparent data with the apparatus 2, and calculates an error rate (Etp) at a constant time interval. In the event of frequent occurrences of transmission errors as in the above, it outputs to the transmission control section 31 a control signal CON for a switchover to the transmission scheme as shown in FIG. 1C.

Due to this, the transmission control section 31 is switched over to make a transmission control based on the parameter C. The parameter C is conveyed as control information provided in a part of a packet header in the transparent data to be sent from the apparatus 1 to the apparatus 2, to the apparatus 2. Due to this, the transmission control section 31 of the apparatus 2 is also switched to perform a transmission control based on the parameter C.

Figure 4:
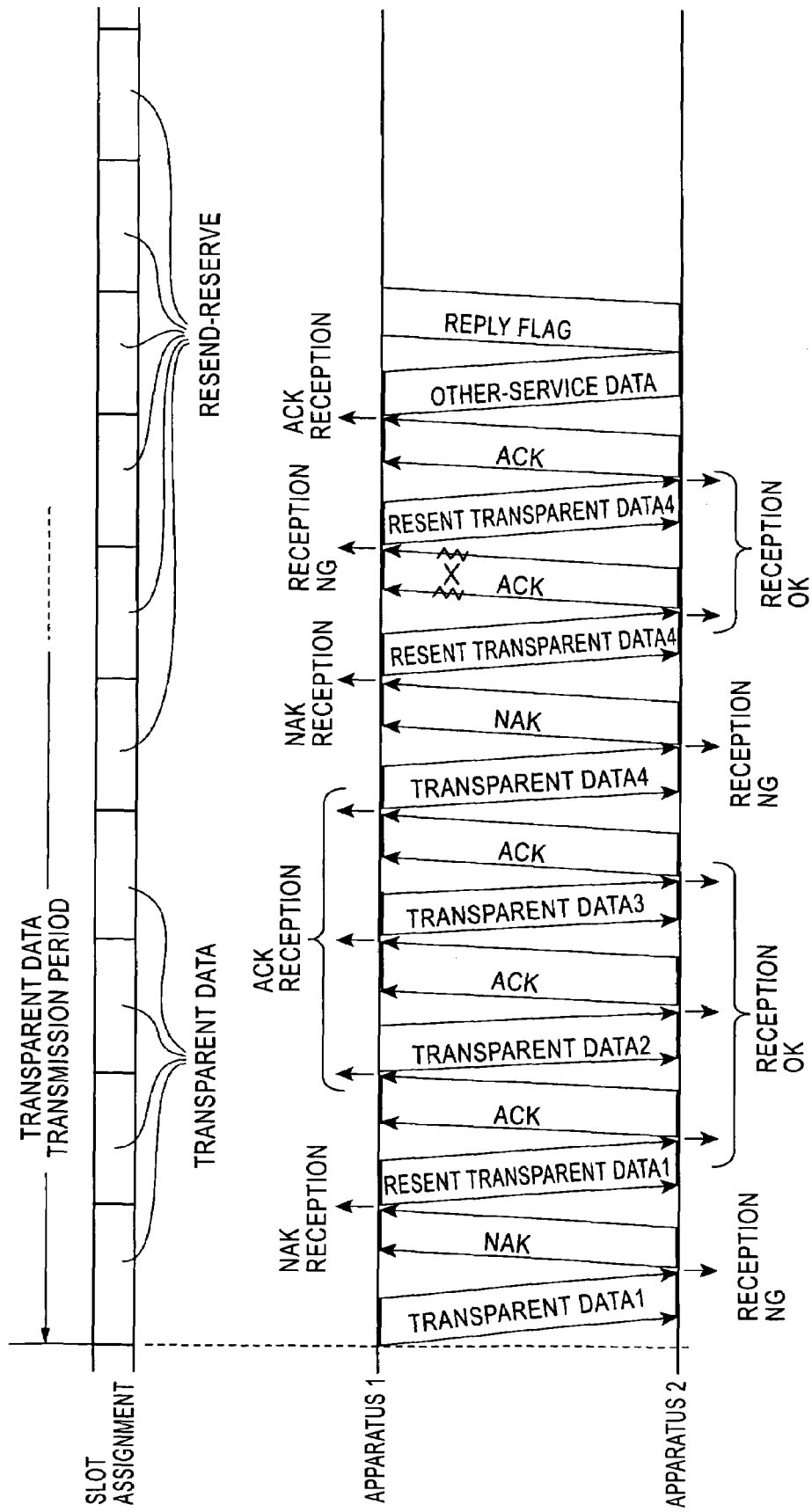
FIG. 4 is a packet transmission sequence chart (−2) in FIG. 1.

FIG. 4 is a packet transmission sequence chart (−2), in FIG. 2, showing an example to send packet data from the apparatus 1 to the apparatus 2 in FIG. 2, according to the transmission scheme of FIG. 1C.

In the transmission sequence of FIG. 4, the transparent data to be sent within one transparent-data transmission period is divided into four. The divisional ones of data are produced in a packet having a coding rate 1/3 and sent by using successive four slots. Incidentally, confirmation-of-delivery flags (ACK) and resend request flags (NAK) are replied from the apparatus 2 on a packet-by-packet basis of transparent data sent from the apparatus 1, similarly to FIG. 3. After confirmed that the transparent data divided into four was all normally received at the apparatus 2, the remaining slots in the transparent-data transmission period are assigned for data transfer for another service.

The transmission-quality monitor section 32 of the apparatus 1 is continuously monitoring the transmission status of transparent data with the apparatus 2. When the error rate is improved into a value equal to or smaller than the threshold, the transmission-quality monitor section 32 outputs to the transmission control section 31 a control signal CON for return to the transmission scheme as shown in FIG. 1A.

Due to this, the transmission control section 31 is switched back to a transmission control based on the parameter A. The parameter A is conveyed as control information provided in a part of a packet header in the transparent data to be sent from the apparatus 1 to the apparatus 2, to the apparatus 2. Due to this, the transmission control section 31 of the apparatus 2 is also switched to perform a transmission control based on the parameter A.

As described above, the present embodiment is allowed to select an optimal parameter meeting a transmission status changing from time to time without restricted to the parameter established at a start of transmission. The use of transparent-data transmission service, as an application, is meant to request a data transmission system to send positively a predetermined amount of data within a certain time period. Accordingly, the capability of preferentially assigning a slot as a transmission resource during a lowering in transmission line quality is to greatly improve the reliability on a transparent-data transmission service and satisfy the request from the application.

Furthermore, when there is an improvement in the transmission line quality, the slots to be assigned for transparent-data transmission service are decreased for assignment for other services. The quality of those services can also be improved at the same time.

Where the parameter for slot assignment is fixed, the status is in that any one of transparent-data transmission service and the other service is sacrificed, or otherwise both are in an imperfect transmission quality. The present embodiment has a superiority in dynamically controlling the transmission parameter in accordance with the status of transmission line.

Meanwhile, in the FIG. 1B transmission scheme, there is a difference in significance between those of data divided into four and contained in respective packets, it is possible to increase the number of resend-reserve slots for a packet higher in significance (e.g. region greater in information amount in video light-intensity information) and decrease the number of resend-reserve slots for a packet lower in significance (e.g. region smaller in information amount in video color information).

Furthermore, in the FIG. 1C transmission scheme, transmission is possible sequentially in the order of higher significance. This provides a merit that at least more significant information can be sent positively as compared to transmission of the entire information on one packet in batch.

Incidentally, the invention is not limited to the foregoing embodiment but can be modified in various ways. Such modifications include the followings.

(1) In the transmission control section 31, when transmission scheme is changed, the control information provided in a part of a packet header is used to notify the relevant fact to the opposite. However, a control packet may be employed separately from the packet for transparent data so that, after notifying previously the change of transmission scheme to the opposite, transparent data can be sent according to the transmission scheme thereof.

(2) In the transmission-quality monitor section 32, the error rate (Etp) measured at a constant time interval is compared with a threshold (Eth), so that a parameter for transmission control can be decided according to a result of comparison thereby providing a control signal CON to the transmission control section 31. Alternatively, two thresholds (Eth1, Eth2; Eth1>Eth2) may be used to give a control signal CON with a hysteresis characteristic. Namely, when the error rate (Etp) increases and exceeds the threshold (Eth1), parameter B or C is provided and thereafter, when the error rate (Etp) decreases into a value of the threshold (Eth2) or smaller, parameter A is provided. This can eliminates the fear that, where the error rate (Etp) fluctuates around the threshold (Eth), communication status is placed instable due to frequent transmission scheme change.

(3) In the transmission-quality monitor section 32, when the error rate (Etp) measured at a constant time interval increases and decreases across the threshold (Eth), the error rate is further measured for a constant time instead of immediate switchover of the transmission control parameter. When the error rate is not returned to the former, the parameter may be switched over. This provides the effect similar to that of (2).

(4) Transmission quality is measured at the transparent-data transmission end (apparatus 1), by monitoring the confirmation-of-delivery flag (ACK) of from the reception end (apparatus 2). Monitoring may be on the status of the transparent data received at the reception end (e.g. error and no delivery), to measure the transmission quality so that instruction is made to the transmission end to change the transmission control scheme.

What is claimed is:

1. A transparent data transmission method for use in a first apparatus, the method comprising the steps of:
    transmitting a set amount of data by means of a radio packet communication at a constant time interval from said first apparatus to a second apparatus,
    measuring a transmission quality by monitoring a response signal sent from said second apparatus each time the data is transmitted; and
    transmitting subsequent data to said second apparatus using a first transmission scheme when a measured transmitting quality satisfies a set level, while transmitting the subsequent data by switching over to a second transmission scheme higher in probability of normal reception than said first transmission scheme when the measured transmitting quality does not satisfy the set level.

2. A transparent data transmission method according to claim 1, wherein the transmission scheme higher in probability of normal reception is a scheme added with an error correcting redundant code, a scheme in which a number of reserve packets for resending is increased, or a scheme in which a period of data transmission is set short.

3. A transparent data transmission method according to claim 2, wherein the switchover of transmission scheme is performed by use of two thresholds with a hysteresis characteristic.

4. A transparent data transmission method according to claim 2, wherein the switchover of transmission scheme is made when a state switchover is to be made continues for a constant time or longer.

5. A transparent data transmission method according to claim 1, wherein the switchover of transmission scheme is performed by use of two thresholds with a hysteresis characteristic.

6. A transparent data transmission method according to claim 1, wherein the switchover of transmission scheme is made when a state switchover is to be made continues for a constant time or longer.

7. A transparent data transmission method for use in a second apparatus, the method comprising the steps of:
    transmitting a set amount of data by means of a radio packet communication at a constant time interval from a first apparatus to said second apparatus,
    measuring a transmission quality by monitoring data sent from said first apparatus each time the data is transmitted; and
    sending an instruction to said first apparatus to perform a transmission by selecting a transmission scheme higher in probability of normal reception when a measured transmission quality does not satisfy a set level, while sending an instruction to said first apparatus to perform a transmission by selecting a transmission scheme higher in transfer efficiency when the measured transmission quality satisfies the set level.

8. A transparent data transmission method according to claim 7, wherein the transmission scheme higher in probability of normal reception is a scheme added with an error correcting redundant code, a scheme in which a number of reserve packets for resending is increased, or a scheme in which a period of data transmission is set short.

9. A transparent data transmission method according to claim 8, wherein a switchover of transmission scheme is performed by use of two thresholds with a hysteresis characteristic.

10. A transparent data transmission method according to claim 8, wherein a switchover of transmission scheme is made when a state switchover is to be made continues for a constant time or longer.

11. A transparent data transmission method according to claim 7, wherein the switchover of transmission scheme is performed by use of two thresholds with a hysteresis characteristic.

12. A transparent data transmission method according to claim 7, wherein a switchover of transmission scheme is made when a state switchover is to be made continues for a constant time or longer.

13. A transparent data transmission method for transmitting a set amount of data by means of a radio packet communication at a constant time interval from a first apparatus to a second apparatus, the method comprising the steps of:
    measuring a transmission quality at said first apparatus by monitoring a response signal sent from said second apparatus each time the data is transmitted;
    transmitting subsequent data to said second apparatus using a first transmission scheme when a measured transmitting quality satisfies a set level, while transmitting the subsequent data to a second transmission scheme higher in probability of normal reception than said first transmission scheme when the measured transmitting quality does not satisfy the set level;

measuring a transmission quality at said second apparatus by monitoring data sent from first apparatus each time the data is transmitted;

sending an instruction to said first apparatus to perform a transmission by switching over to said second transmission scheme when the transmission quality measured at said second apparatus satisfies said set level, while sending an instruction to said first apparatus to perform a transmission by selecting said first transmission scheme when said transmission quality measured at said second apparatus satisfies said set level.

14. A transparent data transmission method according to claim 13, wherein the transmission scheme higher in probability of normal reception is a scheme added with an error correcting redundant code, a scheme in which a number of reserve packets for resending is increased, or a scheme in which a period of data transmission is set short.

15. A transparent data transmission method according to claim 14, wherein the switchover of transmission scheme is performed by use of two thresholds with a hysteresis characteristic.

16. A transparent data transmission method according to claim 14, wherein the switchover of transmission scheme is made when a state switchover is to be made continues for a constant time or longer.

17. A transparent data transmission method according to claim 13, wherein the switchover of transmission scheme is performed by use of two thresholds with a hysteresis characteristic.

18. A transparent data transmission method according to claim 13, wherein the switchover of transmission scheme is made when a state switchover is to be made continues for a constant time or longer.

19. A transparent data transmission method for transmitting a set amount of data by means of a radio packet at a constant time interval from a first apparatus to a second apparatus, the method comprising:

dividing said constant time into time slots in number of m (m: plural number), and dividing the set amount of data into divisional data in number of n (n<m) each having a size to be sent by the time slots; and packet-transmitting the divisional data in number of n by use of said time slots in a descending order of significance.

* * * * *